United States Patent
Huang et al.

(10) Patent No.: US 6,896,932 B2
(45) Date of Patent: May 24, 2005

(54) METHOD OF TREATING METALLIC CORD

(75) Inventors: Yen-How Huang, Solon, OH (US); Thomas Starinshak, Wadsworth, OH (US); David Andrew Benko, Munroe Falls, OH (US); Roger Neil Beers, Uniontown, OH (US); Judy Chu, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 247 days.

(21) Appl. No.: 10/092,278

(22) Filed: Mar. 5, 2002

(65) Prior Publication Data

US 2002/0192489 A1 Dec. 19, 2002

Related U.S. Application Data

(60) Provisional application No. 60/276,580, filed on Mar. 16, 2001.

(51) Int. Cl.[7] .............................. B05D 1/02; B32B 15/06
(52) U.S. Cl. .................... 427/421; 427/428; 427/430.1; 428/625
(58) Field of Search .................................. 427/421, 428, 427/430.1; 428/625

(56) References Cited

U.S. PATENT DOCUMENTS

| | | | |
|---|---|---|---|
| 1,919,718 A | 7/1933 | Gray | |
| 5,221,559 A | 6/1993 | Martigny et al. | 427/419.5 |
| 5,777,012 A * | 7/1998 | Wideman et al. | 524/261 |
| 2002/0192489 A1 * | 12/2002 | Huang et al. | 428/625 |

FOREIGN PATENT DOCUMENTS

| | | | |
|---|---|---|---|
| EP | 137986 | 9/1983 | C08J/5/10 |
| EP | 383150 | 8/1990 | C08J/5/06 |
| WO | 9955809 | 11/1999 | C10M/173/02 |

OTHER PUBLICATIONS

"Fundamental Aspects of Rubber Adhesion to Brass-plated Steel Tire Cords" as published in *Rubber Chemistry and Technology*, vol. 52, pp. 605 through 675, undated.

* cited by examiner

Primary Examiner—Cynthia H. Kelly
Assistant Examiner—Jill M. Gray
(74) Attorney, Agent, or Firm—John D. DeLong; Bruce J. Hendricks

(57) ABSTRACT

A method of treating a metallic cord to improve its ability to adhere to rubber is disclosed. The method involves contacting the metallic cord with a naphthenic oil containing from 1 to 53 percent by weight of a soluble cobalt salt and thereby deposit from 0.002 to 0.7 grams of cobalt per kilogram of steel to the metallic cord.

16 Claims, No Drawings

METHOD OF TREATING METALLIC CORD

The Applicants hereby incorporate by reference prior U.S. Provisional Application Ser. No. 60/276,580, filed on Mar. 16, 2001.

BACKGROUND OF THE INVENTION

Manufacturers of rubber reinforced articles have long realized the importance of the interfacial adhesion of the metal reinforcement of its rubber environment. For example, many tire manufacturers use various cobalt salts as bonding promoters in their steel cord wire coats. The bonding promoters are added through compounding. To achieve a maximum bonding strength, excessive amounts of cobalt salt are added to the wire coat. Since only a very small portion of the cobalt salt was engaged in the rubber-metal interfacial bonding reaction, most of the cobalt salts remained in the compound as excess cobalt without any contribution to the bonding. Cobalt is expensive and may even cause aging problems of the rubber when used in excess.

WO 99/55809 relates to the drawing of wire with the use of a cobalt and/or nickel salt suspension as an adhesive, lubricating and suspending agent. Unfortunately, due to subsequent processing of the wire, levels of the cobalt salt are reduced from the surface of the wire.

U.S. Pat. No. 5,221,559 relates to a method of treating tire cord with a solution of at least one organic compound containing a hydroxyl groups. The solution further contains at least one cobalt and/or nickel compound. In Example 5 of this patent, a brass-plated cable is treated with a paraffin oil containing 1 percent by weight of cobalt naphthenate.

SUMMARY OF THE INVENTION

The present invention relates to a method of treating a metallic cord. The method involves contacting the metallic cord with a naphthenic oil containing from 1 to 53 percent by weight of a soluble cobalt salt and thereby deposit from 0.002 to 0.7 grams of cobalt per kilograms of steel to the cord.

DETAILED DESCRIPTION OF THE INVENTION

The present invention relates to a method of treating a metallic cord to improve its ability to adhere to rubber and increase its corrosion resistance. The present method involves applying napthenic oil to the metallic cord. As used herein, the phrase "cobalt is applied to the cord" is intended herein to mean on the surface of filament(s) in the cord as well as between filaments in the cord. The naphthenic oil contains a soluble cobalt salt. The deposit of oil and the cobalt salt results in increased rubber penetration with improved adhesion. Improved rubber penetration leads to less corrosion migration and improved cable fatigue. The treated cords are then contacted with vulcanizable rubber compositions to form metal reinforced rubber plies. These plies as discussed later may be used to manufacturer rubber articles such as tires, conveyor belts and the like. One of the benefits of the present invention is the reduction or elimination of cobalt compounds commonly used in the wire coat rubber compound.

The metallic cord to be treated according to the present invention may be steel, zinc-plated steel or brass-plated steel. Preferably, the metallic cord is brass plated steel.

The steel substrate may be derived from those known to those skilled in the art. For example, the steel used for wire may be conventional tire cord rod including AISI grades 1070, 1080, 1090 and 1095. The steel may additionally contain varying levels of carbon and microalloying elements such as Cr, B, Ni and Co.

The term "cord" means one or more of a reinforcing element, formed by one or more filaments or wires which may or may not be twisted or otherwise formed. Therefore, cords using the present invention may comprise from one (monofilament) to multiple filaments. The number of total filaments or wires in the cord may range from 1 to 134. Preferably, the number of filaments or wires per cord ranges from 1 to 49.

The number of cord constructions which can be treated according to the present invention are numerous. Representative examples of such cord constructions include 2×, 3×, 4×, 5×, 6×, 7×, 8×, 11×, 12×, 27×, 1+2, 1+3, 1+4, 1+5, 1+6, 1+7, 1+8, 1+14, 1+15, 1+16, 1+17, 1+18, 1+19, 1+20, 1+26, 2+1, 2+2, 2+5, 2+6, 2+7, 2+8, 2+9, 2+10, 2/2, 2/3, 2/4, 2/5, 2/6, 3+1, 3+2, 3+3, 3+4, 3×4, 3+6, 3×7, 3+9, 3/9, 3+9+15, 4+3, 4×4, 5/8/14, 7×2, 7×3, 7×4, 7×7, 7×12, 7×19, 5+1, 6+1, 7+1, 8+1, 11+1, 12+1, 2+7+1, 1+4+1, 1+5+1, 1+6+1, 1+7+1, 1+8+1, 1+14+1, 1+15+1, 1+16+1, 1+17+1, 1+18+1, 1+19+1, 1+20+1, 2+2+8, 2+6+1, 2+7+1, 2+8+1, 2+9+1, 2+10+1, 2+2+8+1, 3+9+15+1, 27+1, 1+26+1, 7×2+1, 3+9+1, 3/9+1, 7×12+1 and 7×19+1. The filaments in the cord constructions may be preformed, waved or crimped. The preferred cord constructions include 2×, 3×, 1+5, 1+6, 1+18, 2+7, 3+2, 3+3 and 3/9+1.

The diameter of an individual wire or filament that is encapsulated or used in a cord that is encapsulated may range from about 0.08 to 0.5 mm. Preferably, the diameter ranges from 0.15 to 0.42 mm.

The tensile strength of the steel filaments in the cord should be at least 3040 MPa−(1200×D) when D is the diameter of the filament. Preferably, the tensile strength of each filament ranges from about 3040−(1200×D) to 4400 MPa−(2000×D).

The method of the present invention involves contacting the cord with naphthenic oil containing a soluble cobalt salt. The oil generally contains from 1 to 53 percent by weight of the cobalt salt. Preferably, the oil contains from 5 to 30 percent by weight of the cobalt salt.

The term "soluble" cobalt salt refers to the solubility of the given cobalt salt in naphthenic oil. Representative examples of suitable soluble cobalt salts include cobalt naphthenate, cobalt neodecanoate, cobalt propionate, cobalt stearate, cobalt benzoate and mixtures thereof Preferably, the cobalt salt is cobalt naphthenate or cobalt neodecanoate.

In addition to the soluble cobalt salt, the naphthenic oil may contain corrosion inhibitors such as alkali metal salts of a carboxylic acid or transitional metal salts of a carboxylic acid. Representative examples include calcium naphthenate, barium naphthenate and strontium naphthenate.

The step of contacting the naphthenic oil to the cord to be treated may be accomplished by spraying, brushing, doctor blade, dipping, wicking and the like. For example, oil mixtures can be applied by dipping the tire cord into the oil mix and using a mechanical or air wipe to control the desired amount of chemical mix on the cord. The oil mix can also be applied by wicking or rubbing the cord against a material that transfers the oil mix. This procedure is subject to variable concentration on the cord. Another method is by spray application which can precisely deliver the amount of the oil mix on the cord and this process requires no subsequent wipes to control amount on cord.

The above processes can be incorporated after the cabling but preferably the chemical mix is applied to the filaments during the cabling, bunching or spiral wrapping process. Also, the oil mix can be applied just prior to rubber/steel cord calendering operation.

Generally speaking, the method of the present invention may be accomplished long before the treated cord is used in the calendering operation. The calendering operation is the step when the treated cord is embedded between two layers of the rubber and pressed to form the metallic reinforced rubber ply. The calendering step is well known to those skilled in the art.

The treated cord will have deposited thereon from 0.002 to 0.7 grams of cobalt per kilogram of steel to the cord. Preferably, from 0.02 to 0.25 grams of cobalt will be deposited on the surface of the treated cord. The amount of cobalt deposited to the cord refers to the amount of cobalt, as cobalt metal, deposited.

The rubber compound that encapsulates the treated cord may contain natural rubber. The natural rubber includes its various forms, e.g., pale crepe and smoked sheet, and balata and gutta percha. The rubber may be solely natural rubber, a blend of natural rubber and synthetic rubber or solely synthetic rubber. The synthetic polymers are derived from a diene monomer and include those prepared from a single monomer (homopolymer) or a mixture of two or more copolymerizable monomers (copolymer) when the monomers are combined in the random distribution or block form. The monomers may be substituted or unsubstituted and may possess one or more double bonds, conjugated and non-conjugated dienes and monoolefins, including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadiene and piperylene. Examples of non-conjugated dienes are 1,4-pentadiene, 1,4-hexadiene, 1,5-hexadiene, dicyclopentadiene, 1,5-cyclooctadiene and ethyldiene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cyclooctene and 4-methyl-cyclooctene. Examples of vinyl monomers are styrene, acrylonitrile, acrylic acid, ethylacrylate, vinyl chloride, butyl acrylate, methyl vinyl ether, vinyl acetate and vinyl pyridine. Examples of vinylidene monomers are alpha-methylstyrene, methacrylic acid, methyl methacrylate, itaconic acid, ethyl methacrylate, glycidyl methacrylate and vinylidene chloride. Representative examples of the synthetic polymers used in the practice of this invention are polychloroprene homopolymers of a conjugated 1,3-diene such as isoprene and butadiene, and in particular, polyisoprenes and polybutadienes having essentially all of their repeat units combined in a cis-1,4-structure; and copolymers of a conjugated 1,3-diene such as isoprene and butadiene with up to 50 percent by weight of at least one copolymerizable monomer, including ethylenically unsaturated monomers such as styrene or acrylonitrile; and butyl rubber, which is a polymerization product of a major proportion of a monoolefin and a minor proportion of a diolefin such as butadiene or isoprene. The rubber may be emulsion polymerized or solution polymerized.

The preferred synthetic rubbers which may be used with the treated cord are cis-1,4-polyisoprene, polybutadiene, polychloroprene and the copolymers of isoprene and butadiene, copolymers of acrylonitrile and butadiene, copolymers of acrylonitrile and isoprene, copolymers of styrene, butadiene and isoprene, copolymers of styrene and butadiene and blends thereof Since the compounds of the present invention are used as a wire coat composition, natural rubber is preferably present and may be partially replaced with synthetic polyisoprene. When used as a blend, the natural rubber is preferably present in an amount ranging from 5 to 95 weight percent of the total rubber present in the wire coat compound.

Throughout this specification and claims, the term "phr" is found. PHR is used herein to describe parts by weight per 100 parts by weight of total rubber in the compound.

Carbon black is present in the rubber compound or wirecoat for use with the treated cord. Representative carbon blacks include N326, N330, N347, N550, N630, N642, N660, N754, N762, N765 and N990. The preferred carbon blacks are N326, N347 and N550. The total amount of carbon black may vary. Generally speaking, the amount of carbon black ranges from 45 to 70 phr. Preferably, the amount of carbon black ranges from 50 to 65 phr.

In order to cure the rubber compound or wire coat, one needs to have a sulfur donor. Examples of suitable sulfur donors or vulcanizing agents include elemental sulfur (free sulfur) or a sulfur donating vulcanizing agent, for example, polymeric polysulfide, sulfur olefin adducts and mixtures thereof Preferably, the sulfur donor or vulcanizing donor is elemental sulfur in the insoluble form. The amount of sulfur vulcanizing donor may vary. The sulfur donor is generally present in an amount ranging from about 0.5 to about 5 phr. Preferably, the sulfur donor is present in an amount ranging from about 2 phr to about 4 phr.

Accelerators are used to control the time and/or temperature required for vulcanization and to improve the properties of the rubber compound or wirecoat. In one embodiment, a single accelerator system may be used; i.e., primary accelerator. In another embodiment, combinations of a primary accelerator and a secondary accelerator might be used with the secondary accelerator being used in a smaller, equal or greater amount to the primary accelerator. In addition, delayed action accelerators may be used in combination with the primary accelerator which are not affected by normal processing temperatures but produce a satisfactory cure at ordinary vulcanization temperatures. Suitable types of accelerators that may be used include sulfenamides, sulfenimides, amines, disulfides, guanidines, thioureas, thiazoles, quinolines, thiurams, dithiocarbamates and xanthates. Preferred primary accelerators are sulfenamides and sulfenimides. If a second accelerator is used, the secondary accelerator is preferably a guanidine, dithiocarbamate or thiuram compound.

The accelerator is generally present in an amount of from about 1 to 3.75 phr. Preferably, the accelerator is present in an amount ranging from about 1.4 to about 3.0 phr.

The weight ratio of sulfur donor to total accelerator present in the wirecoat will vary. Total accelerator means herein the total phr of any primary accelerator when used alone or the total phr of primary and secondary accelerator when used. Generally speaking, the weight ratio of sulfur donor to total accelerator that is present in the wirecoat ranges from 1:1 to 8:1. Preferably, the weight ratio ranges from 2:1 to 5:1.

In situ resins may be formed in the rubber compound or wirecoat stock used with the treated cord. In situ resins involve the reaction of a methylene acceptor and a methylene donor. The term "methylene donor" is intended to mean a compound capable of reacting with a methylene acceptor and generate the resin in situ. Examples of methylene donors which are suitable for use in the present invention include hexamethylenetetramine, hexamethoxymethylmelamine, lauryloxymethylpyridinium chloride, ethoxymethylpyridinium chloride, trioxan hexamethoxymethylmelamine, the hydroxy groups of which may be esterified or partly esterified and polymers of formaldehyde such as paraformaldehyde. In addition, the methylene donors may be N-substituted oxymethylmelamines, of the general formula:

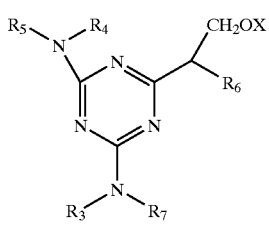

wherein X is an alkyl having from 1 to 8 carbon atoms, $R^3$, $R^4$, $R^5$, $R^6$ and $R^7$, are individually selected from the group consisting of hydrogen, an alkyl having from 1 to 8 carbon atoms, the group —$CH_2OX$ or their condensation products. Specific methylene donors include hexakis-(methoxymethyl)melamine, N,N',N"-trimethyl/N,N',N"-trimethylolmelamine, hexamethylolmelamine, N-methylolmelamine, N,N'-dimethylolmelamine, N,N',N"-tris(methoxymethyl)melamine and N,N'N"-tributyl-N,N', N"-trimethylol-melamine. The N-methylol derivatives of melamine are prepared by known methods.

The amount of methylene donor that is present in the rubber stock may vary. Typically, the amount of methylene donor that is present will range from about 0.1 phr to 10.0 phr. Preferably, the amount of methylene donor ranges from about 2.0 phr to 5.0 phr.

Examples of methylene acceptors include resorcinol, activated phenols by ring substitution and a cashew nut oil modified novalak-type phenolic resin. Representative examples of activated phenols by ring substitution include resorcinol, cresols, t-butyl phenols, isopropyl phenols, ethyl phenols and mixtures thereof. Cashew nut oil modified novolak-type phenolic resins are commercially available from Schenectady Chemicals Inc under the designation SP6700. The modification rate of oil based on total novolak-type phenolic resin may range from 10 to 50 percent. For production of the novolak-type phenolic resin modified with cashew nut oil, various processes may be used. For example, phenols such as phenol, cresol and resorcinol may be reacted with aldehydes such as formaldehyde, paraformaldehyde and benzaldehyde using acid catalysts. Examples of acid catalysts include oxalic acid, hydrochloric acid, sulfuric acid and p-toluenesulfonic acid. After the catalytic reaction, the resin is modified with the oil.

The amount of methylene acceptor that is present in the rubber stock may vary. Typically, the amount of methylene acceptor that is present will range from about 0.1 phr to 10 phr. Preferably, the amount of methylene acceptor ranges from about 2.0 phr to 5.0 phr.

Conventional rubber additives may be incorporated in the rubber stock used as a wirecoat for the treated cord. The additives commonly used in rubber stocks include fillers, plasticizers, waxes, processing oils, retarders, antiozonants, antioxidants and the like. The total amount of filler (other than carbon black as described above) that may be used may range from about 10 to about 150 phr, with a range of from about 10 to about 100 phr being preferred. Fillers include clays, calcium carbonate, calcium silicate and titanium dioxide. Plasticizers are conventionally used in amounts ranging from about 1 to about 50 phr with a range of about 1 to about 10 phr being preferred. The amount of plasticizer used will depend upon the softening effect desired. Examples of suitable plasticizers include aromatic extract oils, naphthenic oil, petroleum softeners including asphaltenes, pentachlorophenol, saturated and unsaturated hydrocarbons and nitrogen bases, coal tar products, cumarone-indene resins and esters such as dibutyl phthalate and tricresol phosphate. Common waxes which may be used include paraffinic waxes and microcrystalline blends. Such waxes are used in amounts ranging from about 0.5 to 3 phr. Materials used in compounding which function as an accelerator-activator includes metal oxides such as zinc oxide and magnesium oxide which are used in conjunction with acidic materials such as fatty acid, for example, stearic acid, oleic acid and the like. The amount of the metal oxide may range from about 1 to about 14 phr with a range of from about 2 to about 8 phr being preferred. The amount of fatty acid which may be used may range from about 1 phr to about 5.0 phr with a range of from about 1 phr to about 2 phr being preferred.

The rubber compounds of the present invention may also contain a cure activator. A representative cure activator is methyl trialkyl ($C_8$–$C_{10}$) ammonium chloride commercially available under the trademark Adogen® 464 from Sherex Chemical Company of Dublin, Ohio. The amount of activator may be used in a range of from 0.05 to 5 phr.

Siliceous pigments may be used in the rubber compound used in the present invention, including pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate. Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930). The silica may also be typically characterized by having a dibutyl phthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size. Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc. Generally speaking, the amount of silica may range from 5 to 120 phr. Since the intended use of the present invention is as a wire coat compound, the silica will generally range from about 0 to 30 phr.

A class of compounding materials known as scorch retarders may be used. Phthalic anhydride, salicylic acid and N-cyclohexyl thiophthalimide are known retarders. Retarders may be used in an amount ranging from about 0.1 to 0.5 phr.

Conventionally, antioxidants and sometimes antiozonants, hereinafter referred to as antidegradants, are added to rubber stocks. Representative antidegradants include monophenols, bisphenols, thiobisphenols, polyphenols, hydroquinone derivatives, phosphites, thioesters, naphthyl amines, diphenyl-p-phenylenediamines, diphenylamines and other diaryl amine derivatives, para-phenylenediamines, quinolines and mixtures thereof. Specific examples of such antidegradants are disclosed in *The Vanderbilt Rubber Handbook* (1990), pages 282 through 286. Antidegradants are generally used in amounts from about 0.25 to about 5.0 phr with a range of from about 0.75 to about 3.0 phr being preferred.

The rubber compound used as a wirecoat compound for the treated cord may contain any of the cobalt materials known in the art to further promote the adhesion of rubber to metal. One advantage of the present invention is the reduction and possible elimination of cobalt compounds in the wirecoat. However, it may be desirable to have some amounts that are present. Thus, suitable cobalt materials which may be employed include cobalt salts of fatty acids such as stearic, palmitic, oleic, linoleic and the like; cobalt salts of aliphatic or alicyclic carboxylic acids having from 6 to 30 carbon atoms, such as cobalt neodecanoate; cobalt chloride, cobalt naphthenate; cobalt carboxylate and an organo-cobalt-boron complex commercially available under the designation Manobond C from Wyrough and Loser, Inc, Trenton, N.J. Manobond C is believed to have the structure:

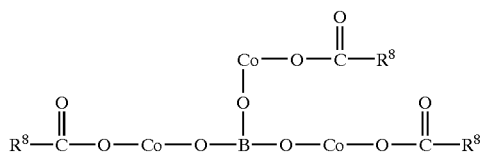

in which $R^8$ is an alkyl group having from 9 to 12 carbon atoms.

Amounts of organo-cobalt compound which may be employed depend upon the specific nature of the cobalt material selected, particularly the amount of cobalt metal present in the compound.

The amount of the cobalt material may range from about 0.2 to 5 phr. Preferably, the amount of cobalt compound may range from about 0.5 to 3 phr. When used, the amount of cobalt material present in the stock composition should be sufficient to provide from about 0.01 percent to about 0.50 percent by weight of cobalt metal based upon total weight of the rubber stock composition with the preferred amounts being from about 0.03 percent to about 0.2 percent by weight of cobalt metal based on total weight of wire coat composition.

The mixing of the rubber compound for use as a wire coat can be accomplished by methods known to those having skill in the rubber mixing art. For example, the ingredients are typically mixed in at least two stages, namely at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The sulfur donor and accelerator(s) are generally mixed in the productive mix stage. The terms "non-productive" and "productive" mix stages are well known to those having skill in the rubber mixing art.

As can be appreciated by one skilled in the art, the treated cord encapsulated by the rubber compound may be used in a number of assembled products. Such products include tank tread pads, automotive components, engine components and the like.

The treated steel wire can be used in a hose, conveyor belts and, in particular, tires. Such pneumatic tires can be built, shaped, molded and cured by various methods which are known and will be readily apparent to those having skill in such art. As can be appreciated, the tire may be a passenger tire, truck tire and the like.

In those instances where the wire of the present invention is used in a cord which is incorporated into a tire, the cord may be used in a belt structure, bead or carcass. "Belt structure" means at least two layers of plies of parallel cords, underlying the tread, unanchored to the bead and having both left and right cord angles in the range from about 17 to about 27 degrees with respect to the equatorial plane (EP) of the tire. "Carcass" means the tire structure apart from the belt structure, the tread and the undertread but including the beads. The carcass ply includes reinforcing cords embedded in an elastomeric substance and that these components are considered to be a single entry.

The present invention may be better understood by reference to the following examples in which the parts or percentages are by weight unless otherwise indicated.

Cure properties were determined using a Monsanto oscillating disc rheometer which was operated at a temperature of 150° C. and 100 cycles per minute. A description of oscillating disc rheometers can be found in the Vanderbilt Rubber Handbook edited by Robert O. Ohm (Norwalk, Conn., R. T. Vanderbilt Company, Inc., 1990), Pages 554 through 557. The use of this cure meter and standardized values read from the curve are specified in ASTM D-2084. A typical cure curve obtained on an oscillating disc rheometer is shown on Page 555 of the 1990 edition of *The Vanderbilt Rubber Handbook*.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following tables report cure properties that were determined from cure curves that were obtained for the rubber stocks that were prepared. These properties include a torque minimum (Min. Torque), a torque maximum (Max. Torque), minutes to 25 percent of the torque increase (t25) and minutes to 90 percent of the torque increase (t90).

Adhesion testing was done to determine the interfacial adhesion between the rubber formulations that were prepared. The interfacial adhesion was determined by pulling one compound from another at a right angle to the untorn test specimen with the two right ends being pulled apart at a 180° angle to each other using an Instron machine. The area of contact was determined from placement of a Mylar™ sheet between the compounds during cure. A window in the Mylar™ allowed the materials to come into contact with each other during testing.

Standard wire adhesion tests (SWAT) were conducted by embedding a single cord in the respective rubber compositions. The rubber articles were then cured at 150° C. for 28 minutes. The cord in these rubber compositions were then subjected to a pull-out test, according to ASTM Standard D2229-73. The results of these pull-out tests (SWAT) and rubber coverage are given below and expressed in Newtons.

In the following examples, all parts are parts by weight per 100 parts by weight of total rubber (phr).

EXAMPLE I

This example was conducted in order to compare the use of naphthenic oil containing 1 percent by weight of cobalt naphthenate versus a paraffinic oil containing 1 percent by weight of cobalt naphthenate. The naphthenic oil was obtained from Calumet Company under the designation Hydrocal-500. The paraffinic oil was obtained from Aldrich Chemical Company under the designation Nujol™. Prior to being applied to the cord, the paraffinic oil mixture was heated, as disclosed in U.S. Pat. No. 5,221,559. The cords were dipped in the respective oil mixtures for 1 minute.

After excess oil was allowed to drip off, the cords dipped in the paraffinic oil mixture were rinsed with ethanol. All of the cords were of a 3×0.22/9×0.20+1×0.15 construction. SWAT blocks were built and analyzed by using standard SWAT. The rubber compound used was a natural rubber/synthetic polyisoprene blend containing conventional amounts of carbon black, plasticizer, tackifying resin, methylene donor, methylene acceptor, amine antidegradants, fatty acid, retarder sulfenamide accelerators, zinc oxide, insoluble sulfur and 3 phr of cobalt naphthenate. The first control had no oil treatment and the SWAT value was normalized to 100. The second control was treated with the paraffinic oil mixture and had a normalized SWAT value of 102. The present invention had a normalized SWAT value of 105.

EXAMPLE II

Experiments were performed utilizing a natural rubber/synthetic polyisoprene blend containing conventional amounts of carbon black plasticizer, methylene acceptor, methylene donor, amine antidegradants, fatty acid, retarder, benzothiazole and disulfide accelerators, zinc oxide and insoluble sulfur. Some of the wire coat compounds contained 1.35 phr of cobalt neodecanoate and some were cobalt free. Cobalt naphthenate was dissolved in a naphthenic oil carrier in various concentrations. The coating oil was premixed with the cobalt naphthenate salt. The naphthenic oil was obtained from Calumet Co. under the designation Hydrocal-100. The cobalt concentrations ranged from zero percent to 10 percent. The cords were dip coated in the oil mixture for about 1 minute. The cords were of a 3×0.22/9×0.20+1×0.15 construction. SWAT blocks were built after the excess oil coat dripped, for about 2 hours, from the cord. Each cord was evaluated utilizing standard SWAT.

TABLE 1

| Sample No. | Cobalt Salt in Wire Coat | Weight Percent of Cobalt Salt in Oil | Weight of Cobalt on Cord[1] | SWAT Pull (N) | Rubber Coverage |
|---|---|---|---|---|---|
| 1 | Yes | 0 | 0 | 520 | 100 |
| 2 | Yes | 0 | 0 | 558.3 | 87 |
| 3 | No | 0 | 0 | 410.8 | 35 |
| 4 | No | 0.0125 | 0.000075 | 422.6 | 25 |
| 5 | No | 0.125 | 0.00075 | 395.8 | 48 |
| 6 | No | 0.125 | 0.00075 | 406.3 | 68 |
| 7 | No | 0.25 | 0.0015 | 437.5 | 68 |
| 8 | Yes | 1 | 0.006 | 565.1 | 93 |
| 9 | No | 1.25 | 0.0075 | 462.1 | 73 |
| 10 | Yes | 5 | 0.032 | 584.8 | 93 |
| 11 | Yes | 10 | 0.064 | 614.9 | 95 |

[1]Grams of cobalt per kilogram of steel in the cord

As can be seen from the above data, increasing the concentration of the cobalt on the cord results in increased SWAT values and rubber coverage in all compounds. Samples 1 through 4 are controls due to the absence of cobalt or a very low concentration of the soluble cobalt salt in the oil.

EXAMPLE III

The cords were treated and tested in the same manner as described in Example II with the except that the rubber formulation was an all natural rubber compound containing conventional amounts of carbon black, silica, plasticizer, tackifier, peptizer, silica coupler, amine antidegradants, fatty acid, retarder, sulfenamide accelerator, quinoline accelerator, zinc oxide and insoluble sulfur. Some of the wire coat compounds contained 1 phr of cobalt naphthenate and some were cobalt free.

Table 2 below tests the data from the SWAT values and rubber coverage for the cords tested.

TABLE 2

| Sample No. | Cobalt Salt in Wire Coat | Weight Percent of Cobalt Salt in Oil | Weight of Cobalt on Cord[1] | SWAT Pull (N) | Rubber Coverage |
|---|---|---|---|---|---|
| 1 | Yes | 0 | 0 | 487 | 64 |
| 2 | Yes | 5 | 0.032 | 481 | 52 |
| 3 | Yes | 10 | 0.064 | 493 | 60 |
| 4 | No | 0 | 0 | 376 | 10 |
| 5 | No | 5 | 0.032 | 462 | 34 |
| 6 | No | 10 | 0.064 | 482 | 50 |

The above data demonstrates that acceptable SWAT values and rubber coverage value can be achieved even when a cobalt salt is not present in the rubber wire coat. In addition, it can be seen that with increasing levels of the cobalt on the cord, the SWAT values increase.

EXAMPLE IV

The cords were treated and tested in the same manner as described in Example II with the exception that the rubber formulation was an all natural rubber compound containing conventional amounts of carbon black, silica, plasticizer, tackifier, peptizer, silica coupler, amine antidegradants, fatty acid, retarder, sulfenamide accelerator, quinoline accelerator, zinc oxide and insoluble sulfur. Some of the wire coat compounds contained 1 phr of cobalt naphthenate and some were cobalt free. The cobalt salt used in the oil, Hydrocal-500, was cobalt neodecanoate.

Table 3 below tests the data from the SWAT values and rubber coverage for the cords tests.

TABLE 3

| Sample No. | Cobalt Salt in Wire Coat | Weight Percent of Cobalt Salt in Oil | Weight of Cobalt on Cord[1] | SWAT Pull (N) | Rubber Coverage |
|---|---|---|---|---|---|
| 1 | Yes | 0 | 0 | 585 | 95 |
| 2 | No | 0 | 0 | 566 | 90 |
| 3 | Yes | 3.1 | 0.07 | 589 | 90 |
| 4 | No | 3.1 | 0.07 | 589 | 95 |
| 5 | Yes | 6.3 | 0.15 | 605 | 95 |
| 6 | No | 6.3 | 0.15 | 615 | 95 |
| 7 | Yes | 12.5 | 0.3 | 597 | 90 |
| 8 | No | 12.5 | 0.3 | 600 | 95 |
| 9 | Yes | 25 | 0.6 | 550 | 90 |
| 10 | No | 25 | 0.6 | 604 | 95 |

The above data demonstrates that acceptable SWAT values and rubber coverage value can be achieved even when a cobalt salt is not present in the rubber wire coat. In addition it can be seen that with increasing levels of cobalt on the cord, the SWAT values increase and surpass the level of cobalt containing rubber compound without cobalt salt in oil coating.

While certain representative embodiments and details have been shown for the purpose of illustrating the invention, it will be apparent to those skilled in this art that various changes and modifications may be made therein without departing from the spirit or scope of the invention.

What is claimed is:

1. A method treating a metallic cord comprising contacting the metallic cord with a naphthenic oil containing from 1 to 6.3 percent by weight of a soluble cobalt salt and thereby deposit to the cord from 0.002 to 0.15 grams of cobalt per kilogram of steel in the metallic cord.

2. The method of claim 1 wherein said naphthenic oil is directly contacted with the cord by means selected from the group consisting of dipping, spraying, rubbing, wicking and combinations thereof.

3. The method of claim 1 wherein the naphthenic oil contains from 1 to 5 percent by weight of cobalt naphthenate.

4. The method of claim 1 wherein said soluble cobalt salt is selected from the group consisting of cobalt naphthenate, cobalt neodecanoate, cobalt propionate, cobalt stearate, cobalt benzoate and mixtures thereof.

5. The method of claim 1 wherein said soluble cobalt salt is cobalt naphthenate.

6. The method of claim 1 wherein said treated cord is contacted with a rubber composition to form a rubber reinforced article.

7. The method of claim 6 wherein said article is selected from the group consisting of a belt, tire and hose.

8. The method of claim 1 wherein said metallic cord is steel.

9. The method of claim 1 wherein the metallic cord is zinc-plated or brass-plated.

10. The method of claim 1, wherein the naphthenic oil contains from 1 to 6.3 percent by weight of cobalt neodecanoate.

11. A method treating a metallic cord comprising contacting the metallic cord with a naphthenic oil containing from 1 to 53 percent by weight of cobalt naphthenate and thereby deposit to the cord from 0.002 to 0.7 grams of cobalt per kilogram of steel in the metallic cord.

12. The method of claim 11, wherein the naphthenic oil contains from 5 to 30 percent by weight of cobalt naphthenate.

13. The method of claim 11 wherein said treated cord is contacted with a rubber composition to form a rubber reinforced article.

14. The method of claim 11 wherein said article is selected from the group consisting of a belt, tire and hose.

15. The method of claim 11 wherein said metallic cord is steel.

16. The method of claim 11 wherein the metallic cord is zinc-plated or brass-plated.

* * * * *